United States Patent
Kawaguchi

(10) Patent No.: US 9,128,648 B2
(45) Date of Patent: Sep. 8, 2015

(54) IMAGE FORMING APPARATUS AND CONTROL METHOD THEREOF

(71) Applicant: CANON KABUSHIKI KAISHA, Tokyo (JP)

(72) Inventor: Tadashi Kawaguchi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/553,971

(22) Filed: Nov. 25, 2014

(65) Prior Publication Data

US 2015/0153973 A1    Jun. 4, 2015

(30) Foreign Application Priority Data

Nov. 29, 2013    (JP) .................................. 2013-247707

(51) Int. Cl.
  *G06K 15/00*  (2006.01)
  *G06F 3/12*   (2006.01)
  *G05B 15/02*  (2006.01)

(52) U.S. Cl.
  CPC .............. *G06F 3/1221* (2013.01); *G05B 15/02* (2013.01); *G06F 3/1232* (2013.01)

(58) Field of Classification Search
  CPC .......... H04N 1/00896; H04N 1/00885; H04N 1/00891; H04N 1/32539; H04N 2201/0091; H04N 2201/0093; H04N 1/00278; H04N 1/00954; H04N 2201/001; H04N 1/00034; H04N 1/00037; H04N 1/00904; H04N 2201/0072; H04N 1/00917; H04N 1/00928; G06F 1/3228; G06F 1/3234; G06F 1/3203; G06F 1/3268; G06F 3/1212; G06F 3/1215; G06F 11/1438; G06F 1/3231; G06F 1/3287; G06F 1/3293; G06F 3/1211; Y02B 60/121; Y02B 60/1282; Y02B 60/1289; G06K 15/4055; G06K 15/406

USPC .............. 358/1.1, 1.14; 399/88, 67; 386/230; 713/323
  See application file for complete search history.

(56) References Cited

U.S. PATENT DOCUMENTS

| | | | | |
|---|---|---|---|---|
| 2011/0318044 | A1* | 12/2011 | Matsumoto | 399/88 |
| 2012/0137154 | A1* | 5/2012 | Azuma et al. | 713/323 |
| 2013/0057894 | A1* | 3/2013 | Narushima et al. | 358/1.14 |
| 2013/0164012 | A1* | 6/2013 | Kinoshita et al. | 399/67 |
| 2014/0023339 | A1* | 1/2014 | Takahashi | 386/230 |

FOREIGN PATENT DOCUMENTS

JP    2010-218120 A    9/2010

* cited by examiner

*Primary Examiner* — Iriana Cruz

(74) *Attorney, Agent, or Firm* — Canon USA, Inc., IP Division

(57) ABSTRACT

An image forming apparatus includes execution units configured to execute predetermined functional processing, and switches to a second power state lower than a first power state. After a user selects priority on power saving or priority on convenience as a condition for switching to the second power state, the image forming apparatus receives a plurality of recovery triggers for switching to the first power state. A number of times of detection of each recovery trigger received is stored. If the user selects priority on convenience, it is determined whether the number of times of detection of each recovery trigger requiring a large power amount consumed by execution units associated with each recovery trigger falls below a predetermined threshold. If it is determined that the number of times of detection of a recovery trigger falls below the predetermined threshold, the recovery trigger may be disabled.

20 Claims, 14 Drawing Sheets

| | | MANUAL FEED TRAY | ADF | TOUCH PANEL | CARD READER | HUMAN BODY DETECTION SENSOR | PANEL KEY AnyKey |
|---|---|---|---|---|---|---|---|
| 102— | SCANNER UNIT | OFF | POWER SAVING 1 | OFF | OFF | OFF | OFF |
| 116— | PRINT ENGINE | POWER SAVING 1 | OFF | OFF | OFF | OFF | OFF |
| 109— | DISPLAY CONTROL UNIT | POWER SAVING 1 | POWER SAVING 1 | ON | POWER SAVING 1 | POWER SAVING 1 | POWER SAVING 2 |
| 117— | CONTROL UNIT | ON | ON | POWER SAVING 1 | POWER SAVING 1 | POWER SAVING 1 | POWER SAVING 2 |
| | TOTAL (W) | aa | bb | cc | dd | dd | ee |
| | ECO-STATUS | ✿ | ✿ | ✿✿ | ✿✿✿ | ✿✿✿ | ✿✿✿✿ |

Power saving 1 and power saving 2 represent power consumption amounts, respectively (power saving 1 > power saving 2).

The total (W) is a total power consumption amount (aa > bb > cc > dd > ee).

Each eco-status is an indirect expression of power saving determined on the basis of a power consumption amount threshold. More leaves represent a less power consumption amount.

FIG.4A (1) DISPLAYED CONTENT WHEN "PRIORITY ON ENERGY SAVING" IS SELECTED

| POWER SAVING MODE SETTING |
|---|
| ☑ PRIORITY ON ENERGY SAVING |
| ☐ PRIORITY ON CONVENIENCE |

(2) DISPLAYED CONTENT WHEN "PRIORITY ON ENERGY SAVING" IS SELECTED

| RECOVERY TRIGGER SETTING |
|---|
| ☐ DETECTION OF ADF DOCUMENT |
| ☑ PRESS OF PANEL KEY |
| ☐ READING OF CARD |
| ☐ PAPER ON MANUAL FEED TRAY |
| ☐ DETECTION BY HUMAN BODY DETECTION SENSOR |
| ☐ OPERATION OF TOUCH PANEL |

(1) SCREEN BEFORE UPDATED (2) SCREEN BEFORE UPDATED

MESSAGE ABOUT RECOVERY TRIGGER SETTING

☑ READING OF CARD

USE OF THE SETTING OF POWER SAVING MODE IS LOW.
DISABLING THE SETTING CAN IMPROVE THE POWER SAVING EFFECT.
DISABLE THE SETTING?

☐ YES
☐ NO

FIG.4C (1) SCREEN BEFORE UPDATED

MESSAGE ABOUT RECOVERY TRIGGER SETTING

☑ READING OF CARD

USE OF THE SETTING OF POWER
SAVING MODE IS LOW.
DISABLING THE SETTING CAN
IMPROVE THE POWER SAVING EFFECT.
DISABLE THE SETTING?

☐ YES
☑ NO (2) SCREEN BEFORE UPDATED

MESSAGE ABOUT RECOVERY TRIGGER SETTING

☐ DETECTION OF ADF DOCUMENT
☐ DETECTION BY HUMAN BODY
　　DETECTION SENSOR

USE OF THE SETTING OF NORMAL
OPERATION IS LOW.
ENABLING THE SETTING CAN IMPROVE
CONVENIENCE.
ENABLE THE SETTING?

☐ YES
☐ NO (1) SCREEN BEFORE UPDATED

| MESSAGE ABOUT RECOVERY TRIGGER SETTING |
| --- |
| ☑ DETECTION OF ADF DOCUMENT |
| ☑ DETECTION BY HUMAN BODY DETECTION SENSOR |

USE OF THE SETTING OF NORMAL OPERATION IS LOW.
ENABLING THE SETTING CAN IMPROVE CONVENIENCE.
ENABLE THE SETTING?
☑ YES
☐ NO (2) SCREEN AFTER UPDATED

FIG.5A (1) DISPLAYED CONTENT WHEN "PRIORITY ON CONVENIENCE" IS SELECTED

| POWER SAVING MODE SETTING |
|---|
| ☐ PRIORITY ON ENERGY SAVING |
| ☑ PRIORITY ON CONVENIENCE |

(2) DISPLAYED CONTENT WHEN "PRIORITY ON CONVENIENCE" IS SELECTED

| RECOVERY TRIGGER SETTING |
|---|
| ☑ DETECTION OF ADF DOCUMENT |
| ☑ PRESS OF PANEL KEY |
| ☑ READING OF CARD |
| ☑ PAPER ON MANUAL FEED TRAY |
| ☑ DETECTION BY HUMAN BODY DETECTION SENSOR |
| ☑ OPERATION OF TOUCH PANEL |

FIG.5B

(1) SCREEN BEFORE UPDATED

RECOVERY TRIGGER SETTING
- ☑ DETECTION OF ADF DOCUMENT
- ☑ PRESS OF PANEL KEY
- ☑ READING OF CARD
- ☐ PAPER ON MANUAL FEED TRAY
- ☑ DETECTION BY HUMAN BODY DETECTION SENSOR
- ☐ OPERATION OF TOUCH PANEL

STANDBY POWER CONSUMPTION: bbW

ECO-STATUS: 🌳

(2) SCREEN BEFORE UPDATED

MESSAGE ABOUT RECOVERY TRIGGER SETTING
- ☑ READING OF CARD
- ☑ DETECTION BY HUMAN BODY DETECTION SENSOR

USE OF THE SETTING OF POWER SAVING MODE IS LOW. DISABLING THE SETTING CAN IMPROVE THE POWER SAVING EFFECT. DISABLE THE SETTING?
- ☐ YES
- ☐ NO

FIG.5C (1) SCREEN BEFORE UPDATED

| MESSAGE ABOUT RECOVERY TRIGGER SETTING |
| --- |
| ☐ DETECTION OF ADF DOCUMENT |
| ☐ DETECTION BY HUMAN BODY DETECTION SENSOR |

USE OF THE SETTING OF POWER SAVING MODE IS LOW.
DISABLING THE SETTING CAN IMPROVE THE POWER SAVING EFFECT.
DISABLE THE SETTING?

☑ YES
☐ NO (2) SCREEN BEFORE UPDATED

| MESSAGE ABOUT RECOVERY TRIGGER SETTING |
| --- |
| ☐ PAPER ON MANUAL FEED TRAY |
| ☐ OPERATION OF TOUCH PANEL |

USE OF THE SETTING OF NORMAL OPERATION IS LOW.
ENABLING THE SETTING CAN IMPROVE CONVENIENCE.
ENABLE THE SETTING?

☐ YES
☐ NO

FIG.5D

(1) SCREEN BEFORE UPDATED

MESSAGE ABOUT RECOVERY TRIGGER SETTING
- ☑ DETECTION OF ADF DOCUMENT
- ☑ DETECTION BY HUMAN BODY DETECTION SENSOR

USE OF THE SETTING OF NORMAL OPERATION IS LOW.
ENABLING THE SETTING CAN IMPROVE CONVENIENCE.
ENABLE THE SETTING?
- ☐ YES
- ☑ NO (2) SCREEN AFTER UPDATED

RECOVERY TRIGGER SETTING
- ☐ DETECTION OF ADF DOCUMENT
- ☑ PRESS OF PANEL KEY
- ☑ READING OF CARD
- ☐ PAPER ON MANUAL FEED TRAY
- ☐ DETECTION BY HUMAN BODY DETECTION SENSOR
- ☐ OPERATION OF TOUCH PANEL

STANDBY POWER CONSUMPTION: bbW (BELOW aa)
ECO-STATUS: 🌱🌱🌱

FIG.6

| | MANUAL FEED TRAY | ADF | TOUCH PANEL | CARD READER | HUMAN BODY DETECTION SENSOR | PANEL KEY AnyKey |
|---|---|---|---|---|---|---|
| SCANNER UNIT | OFF | POWER SAVING 1 | OFF | OFF | OFF | OFF |
| PRINT ENGINE | POWER SAVING 1 | OFF | OFF | OFF | OFF | OFF |
| DISPLAY CONTROL UNIT | POWER SAVING 1 | POWER SAVING 1 | ON | POWER SAVING 1 | POWER SAVING 1 | POWER SAVING 2 |
| CONTROL UNIT | ON | ON | POWER SAVING 1 | POWER SAVING 1 | POWER SAVING 1 | POWER SAVING 2 |
| TOTAL (W) | aa | bb | cc | dd | dd | ee |
| ECO-STATUS | 🌿 | 🌿🌿 | 🌿🌿 | 🌿🌿🌿 | 🌿🌿🌿 | 🌿🌿🌿🌿 |

Power saving 1 and power saving 2 represent power consumption amounts, respectively (power saving 1 > power saving 2).

The total (W) is a total power consumption amount (aa > bb > cc > dd > ee).

Each eco-status is an indirect expression of power saving determined on the basis of a power consumption amount threshold. More leaves represent a less power consumption amount.

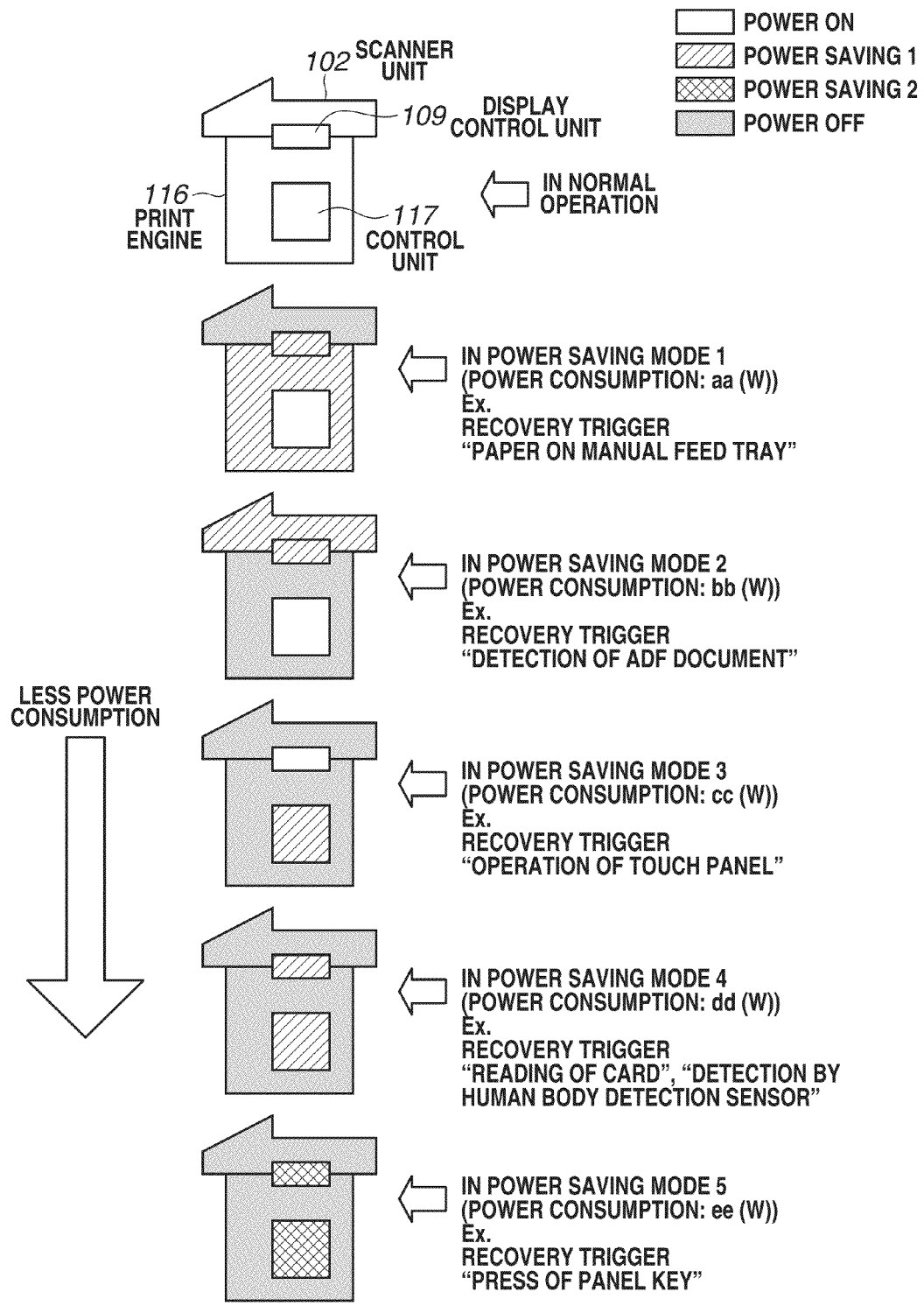

IMAGE FORMING APPARATUS AND CONTROL METHOD THEREOF

BACKGROUND OF THE INVENTION

1. Field of the Invention

The present invention(s) relate to an image forming apparatus and a control method thereof.

2. Description of the Related Art

Image forming apparatuses such as laser printers, copying machines, and facsimile machines have a power saving mode for performing power saving control and have various functions. However, these image forming apparatuses have control specifications in which power consumed by the apparatuses in the power saving mode fluctuates by power constraint of each control block for using a corresponding function.

Thus, when a user uses a conventional image forming apparatus having a plurality of power saving modes, even if the user selects an optimum power saving mode, the image forming apparatus is affected by power constraint based on the control specifications of the functions. Namely, the image forming apparatus could fail to realize power consumption in the selected power saving mode.

To solve such problem, Japanese Patent Application Laid-Open No. 2010-218120 discusses a method for realizing further power reduction in the power saving mode. According to this method, if the image forming apparatus has a plurality of triggers to recover from a power saving mode to a normal operation state, a detection unit to be enabled/disabled is selected from the detection units corresponding to the respective triggers. Power is not supplied to the detection unit selected to be disabled. Namely, each of the recovery triggers is enabled/disabled manually, and power consumption is realized based on the selection result in the power saving mode.

However, according to Japanese Patent Application Laid-Open No. 2010-218120, regarding a recovery trigger corresponding to a detection unit selected to be enabled, while a function having the detection unit is not being used, unnecessary power for maintaining the function in a standby state is consumed. Thus, even if the user places priority on power saving, the user cannot obtain the maximum power saving effect.

In contrast, regarding a recovery trigger corresponding to a detection unit selected to be disabled, if a function having the detection unit is used more frequently in the normal operation state, the function cannot be started from the power saving mode within the shortest standby time. Thus, even if the user places priority on convenience, the usability of the apparatus cannot be improved.

SUMMARY OF THE INVENTION

The present invention(s) are directed to at least one mechanism, and methods of using same, capable of realizing power saving control that conforms to a power saving environment set by a user and facilitates convenience and power saving.

An image forming apparatus according to the present invention(s) is configured as follows.

The present invention(s) provide at least one image forming apparatus that switches to a second power state which is lower than a first power state. At least one image forming apparatus includes a plurality of execution units configured to execute predetermined functional processing, a selection unit configured to select priority on power saving or priority on convenience as a condition for switching to the second power state which is lower than the first power state, a reception unit configured to receive a plurality of recovery triggers for switching to the first power state from the second power state, a storage unit configured to store a number of times of detection of each recovery trigger received by the reception unit, a determination unit configured to determine, if the selection unit selects priority on convenience, whether the number of times of detection of each recovery trigger requiring a large power amount consumed by execution units associated with each recovery trigger, which is stored in the storage unit, falls below a predetermined threshold, a notification unit configured to notify a user of a recovery trigger as the recovery trigger that needs to be disabled if the determination unit determines that the number of times of detection of the recovery trigger falls below a predetermined threshold, and a disabling unit configured to, if the user accepts disabling a recovery trigger of which the user has been notified by the notification unit, disable the recovery trigger determined to fall below the predetermined threshold. Another image forming apparatus according to the present invention(s) is configured as follows.

The present invention(s) provide at least another image forming apparatus that switches to a second power state which is lower than a first power state. The at least another image forming apparatus includes a plurality of execution units configured to execute predetermined functional processing, a selection unit configured to select priority on power saving or priority on convenience as a condition for switching to the second power state which is lower than the first power state, a reception unit configured to receive a plurality of recovery triggers for switching to the first power state from the second power state, a storage unit configured to store a number of times of detection of each recovery trigger received by the reception unit, a determination unit configured to determine, if the selection unit selects priority on power saving, whether the number of times of detection of each recovery trigger requiring a large power amount consumed by execution units associated with each recovery trigger, which is stored in the storage unit, exceeds a predetermined threshold, a notification unit configured to notify a user of a recovery trigger as the recovery trigger that needs to be enabled if the determination unit determines that the number of times of detection of a recovery trigger exceeds the predetermined threshold, and an enabling unit configured to enable, if the user accepts enabling a recovery trigger of which the user has been notified by the notification unit, the recovery trigger determined to be exceeding a corresponding predetermined threshold. According to other aspects of the present invention(s), methods of using such apparatuses are discussed herein below.

Further features of the present invention(s) will become apparent from the following description of exemplary embodiments with reference to the attached drawings.

BRIEF DESCRIPTION OF THE DRAWINGS

FIGS. 4A(1) and 4A(2) illustrate user interface (UI) screens displayed by the image forming apparatus.

FIGS. 4C(1) and 4C(2) illustrate UI screens displayed by the image forming apparatus.

FIGS. 5A(1) and 5A(2) illustrate UI screens displayed by the image forming apparatus.

FIGS. 5B(1) and 5B(2) illustrate UI screens displayed by the image forming apparatus.

FIGS. 5C(1) and 5C(2) illustrate UI screens displayed by the image forming apparatus.

FIGS. 5D(1) and 5D(2) illustrate UI screens displayed by the image forming apparatus.

FIG. 6 illustrates a power consumption amount management table.

FIG. 7 is a conceptual diagram illustrating power consumption amounts based on respective modes.

DESCRIPTION OF THE EMBODIMENTS

Various exemplary embodiments, features, and aspects of the invention will be described in detail below with reference to the drawings.

<Description of System Configuration>

Figure 1:
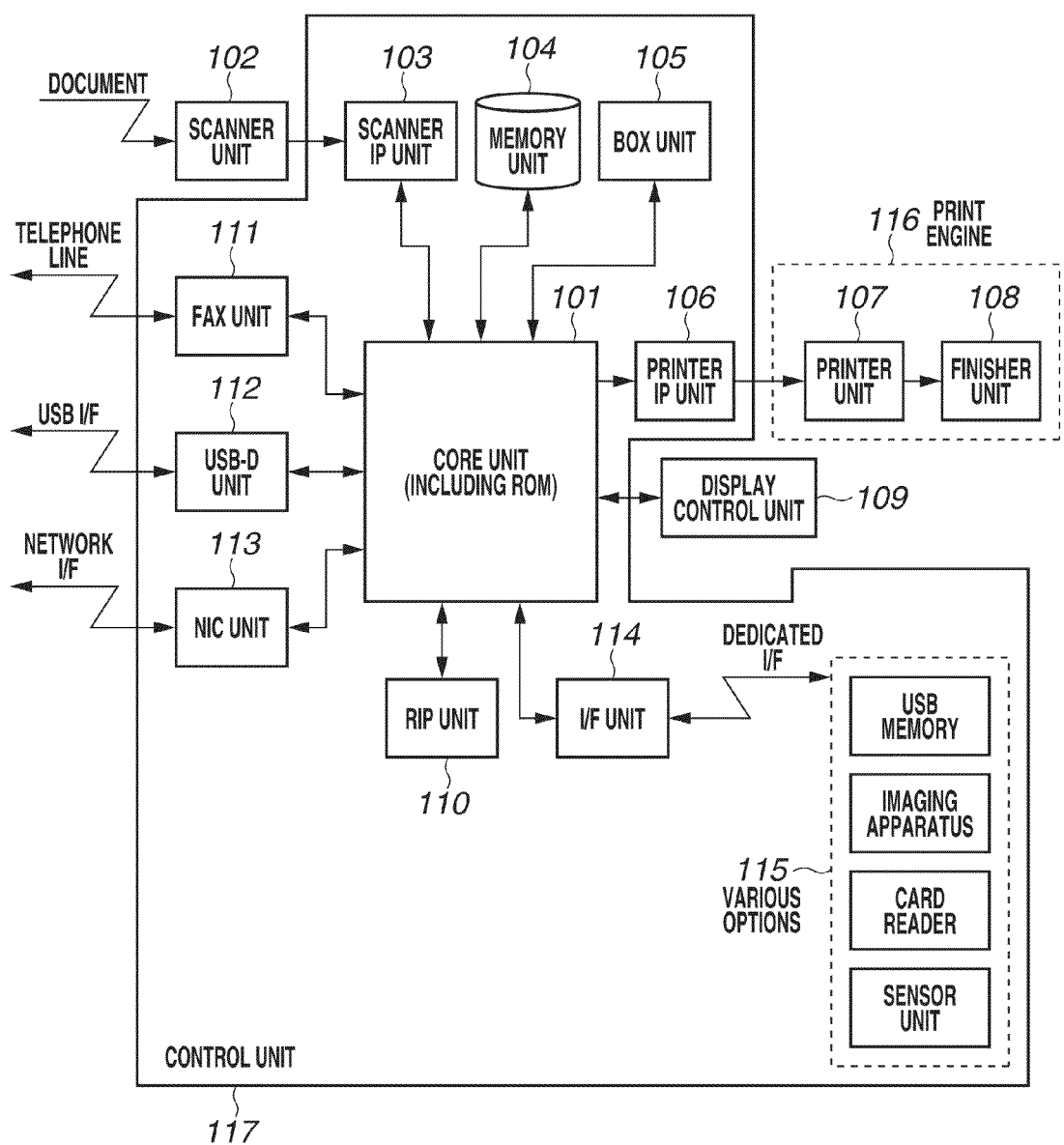
FIG. 1 is a block diagram illustrating a configuration of an image forming apparatus.

FIG. 1 is a block diagram illustrating a configuration of an image forming apparatus 10 according to a first exemplary embodiment. However, since components described in this exemplary embodiment are merely examples, the scope of the present invention is not limited thereto. As will be described in detail below, the image forming apparatus 10 according to the present exemplary embodiment has a configuration for performing power saving control in which the image forming apparatus 10 switches to a second power state that is lower than a first power state.

The present exemplary embodiment will be described assuming that the image forming apparatus 10 is a copying machine that performs an image forming operation and an image input/output operation on the basis of instructions from a display unit. However, the present invention can be applied to a laser printer that has a specialized print function for performing print processing on sheets (paper) or a facsimile machine that has a specialized facsimile (FAX) function.

As illustrated in FIG. 1, the image forming apparatus 10 includes a core unit 101 connected to a scanner IP 103. The core unit 101 performs an image forming operation by accessing a scanner unit 102 or a printer unit 107 on the basis of instructions from a display control unit 109. In addition, the core unit 101 communicates with an external interface (I/F). The core unit 101 comprehensively controls the entire image forming apparatus 10.

The "IP" of the scanner IP signifies an IP core, namely, partial hardware circuits put together per functional unit when a control circuit is configured by a large scale integration (LSI) circuit or the like. The core unit 101 includes a read-only memory (ROM), storing a boot program for starting an operating system (OS) or a system bootable program for comprehensively controlling the entire apparatus.

In addition, the core unit 101 stores a bootable program storing a control procedure for realizing a plurality of functions such as a scan function, a print function, a FAX function, and a file transmission (SEND) function. In addition, for example, the core unit 101 stores a network interface card (NIC) bootable program storing a control procedure for communication with an external information apparatus and a page description language (PDL) bootable program storing a raster data generation procedure.

The core unit 101 includes an LSI circuit in which a high-function CPU and hardware circuits put together per functional block are configured as a single package.

The scanner unit 102 reads a document image by using a photoelectric conversion element, performs analog/digital (A/D) conversion and shading correction, and generates a digital image of red, green, and blue (RGB). The scanner unit 102 includes a ROM storing a program for driving of a sheet feed system, a conveyance system, and an optical system that are related to a scan operation, for control of various sensors, and for correction, control, and transfer of input/output image data. The scanner IP 103 includes a circuit block for performing image processing in the reader system on the RGB digital image data output from the scanner unit 102.

A memory unit 104 functions as a main memory for the core unit 101 and a readable and writable storage apparatus used as a work area for drawing processing and a rasterization area for print output information. A box unit 105 is configured to stored images and is used as a buffer area when data is exchanged via an external I/F.

A printer IP unit 106 includes a circuit block for performing image processing in the print system on each of the color component signals of yellow, magenta, cyan, and black (YMCK) output from the core unit 101 and generating an output video signal. The printer unit 107 performs processing for developing, transferring, and fixing the output video signal on a recording paper when a print operation is started.

In addition, the printer unit 107 controls driving of a sheet feed system, a conveyance system, and an optical system that are related to a print operation, controls various sensors, controls a high voltage for image formation, controls various units such as a laser scanner, a developing unit, and a fixing unit, controls the output video data, and controls a finishing function. In addition, the printer unit 107 includes a ROM storing a program for controlling processing corresponding to each of the above functions. A finisher unit 108 performs post-processing such as sorting or stapling on the recording paper output from the printer unit 107.

The display control unit 109 communicates with the core unit 101 and detects press of a key, for example. To display various system statuses, the display control unit 109 includes switches, a light-emitting diode (LED) display, and a liquid crystal display (LCD) module, for example. A raster image processing (RIP) unit 110 performs processing for generating raster pattern data on the basis of print information from an external information apparatus.

A FAX unit 111 is connected to an analog/digital public line and can transmit and receive images. The FAX unit 111 includes a ROM storing a program for controlling the public line, controlling and transferring transmitted and received image data, and controlling transfer settings, for example.

A universal serial bus data (USB-D) unit 112 performs control of communication with an external information apparatus via a USB I/F and receives print data. An NIC unit 113 performs control communication with an external information apparatus via a network and performs recording information processing of various applications.

An I/F unit 114 includes a dedicated I/F for controlling options such as a removable storage apparatus such as a USB storage unit, an imaging apparatus, a card reader capable of performing billing control or section designation control, and various sensors such as a human body detection sensor and an illumination sensor. Various options 115 enable communication control with the core unit 101 via the I/F unit 114.

A print engine 116 includes the printer unit 107 and the finisher unit 108 to perform an image forming operation. A control unit 117 performs system control of the image forming apparatus 10.

<Example of Power Supply Unit 40 of Image Forming Apparatus 10>

Figure 2:
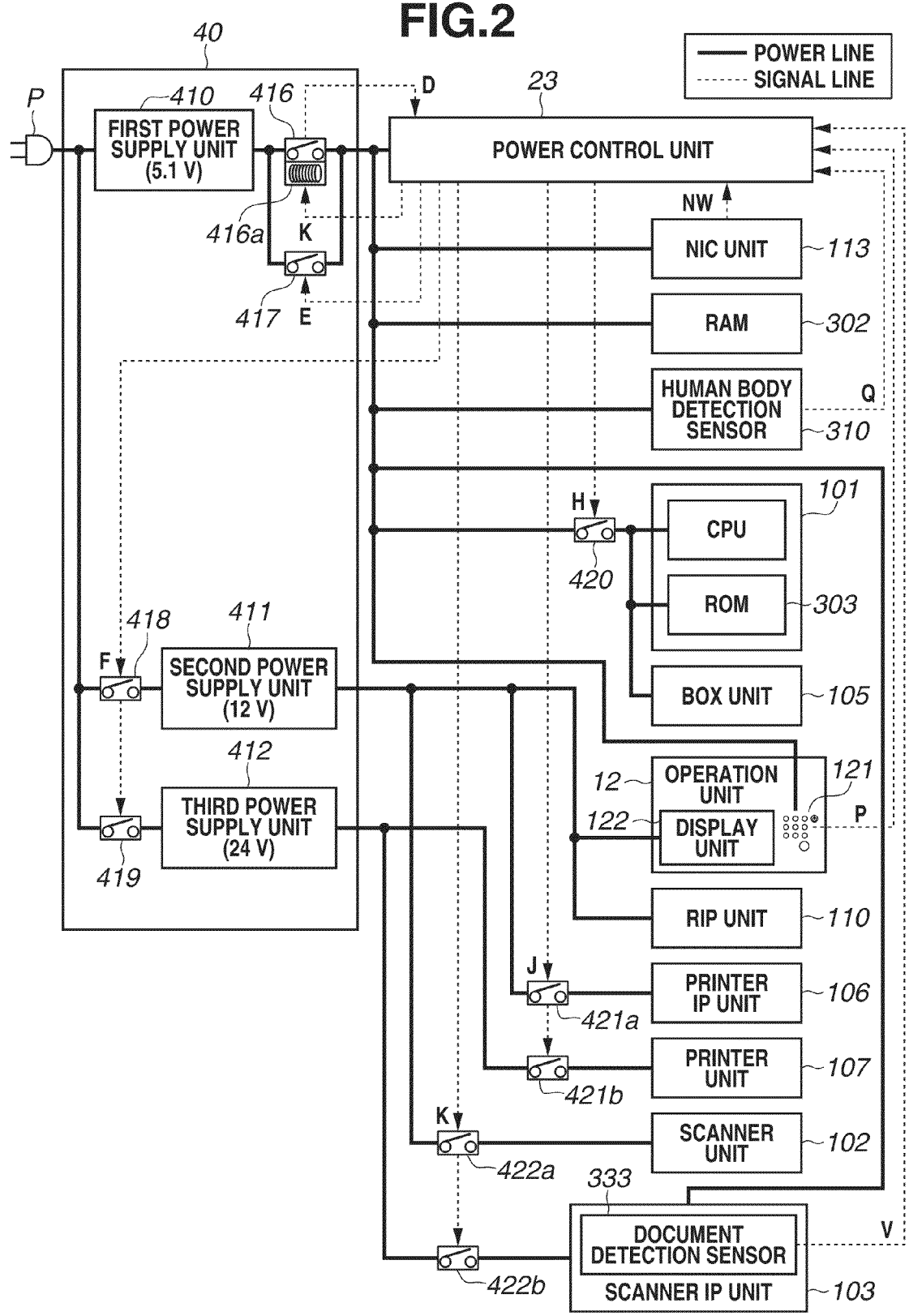
FIG. 2 is a power supply circuit diagram of the image forming apparatus.

FIG. 2 is a power supply circuit diagram of the image forming apparatus 10 according to the present exemplary embodiment. A power supply unit 40 generates power that is supplied to each unit of the image forming apparatus 10 illustrated in FIG. 1. This power supply unit 40 includes first to third power supply units 410 to 412, respectively. FIG. 2 illustrates units having functions that are the same as or similar to those in FIG. 1. These units are denoted by the same reference characters and redundant description thereof will be avoided.

In FIG. 2, the first power supply unit 410 converts alternating-current (AC) power supplied via a plug P into direct-current (DC) power (for example, 5.1 V (first output power)). The DC power is supplied to devices in a first power supply system (a power control unit 23, the core unit 101, a RAM 302, a ROM 303, the box unit 105, the NIC unit 113, a human body detection sensor 310, and a button 121 of an operation unit 12). In the present exemplary embodiment, the core unit 101 does not receive power supplied from the second power supply unit 411 or the third power supply unit 412 but operates only with power supplied from the first power supply unit 410. Namely, the power source of the core unit 101 is separated from the second power supply unit 411 and the third power supply unit 412.

The second power supply unit 411 converts AC power supplied via the plug P into DC power (for example, 12 V (second output power)). This DC power is supplied to devices in a second power supply system (a display unit 122 of the operation unit 12, the image RIP unit 110, the printer IP unit 106, and the scanner unit 102. In addition, the third power supply unit 412 converts AC power supplied via the plug P into DC power (for example, 24 V) and supplies the power to devices in a third power supply system (the printer unit 107 and the scanner IP 103).

In addition, a power supply switch 416 is arranged between the first power supply unit 410 and the devices in the first power supply system. Depending on a user operation, the power supply switch 416 sets the devices to an ON or OFF state. The power control unit 23 is supplied with a signal D indicating the state (the ON or OFF state) of the power supply switch 416. In addition, the power supply unit has a switch 417 that is arranged in parallel with the power supply switch 416 and includes a field-effect transistor (FET). This switch 417 changes between ON and OFF states, depending on a control signal E output from the power control unit 23. The power supply switch 416 includes a solenoid 416a.

Depending on a control signal K output from the power control unit 23, a voltage is applied to the solenoid 416a, and as a result, the power supply switch 416 is set to the OFF state. If an auto shutdown function or a remote shutdown function provided in the image forming apparatus is performed, the power control unit 23 outputs the control signal K. As a result, the solenoid 416a is driven, and the power supply switch 416 is set to the OFF state. The auto shutdown function is a function of shutting down the image forming apparatus 10 if no user operation is input in a second sleep state for a predetermined time. The remote shutdown function is a function of shutting down the image forming apparatus 10 in accordance with a shutdown instruction transmitted from an external apparatus.

A relay switch 418 is arranged between the plug P and the second power supply unit 411. In addition, a relay switch 419 is arranged between the plug P and the third power supply unit 412. These relay switches 418 and 419 change between ON and OFF states, depending on a control signal F output from the power control unit 23.

A switch 420 is arranged between the power supply switch 416 and a group of the core unit 101, the ROM 303, and the box unit 105. The switch 420 changes between ON and OFF states, depending on a control signal H output from the power control unit 23.

A switch 421a is arranged between the second power supply unit 411 and the printer IP unit 106. In addition, a switch 421b is arranged between the third power supply unit 412 and the printer unit 107. These switches 421a and 421b change between ON and OFF states, depending on a control signal J output from the power control unit 23.

A switch 422a is arranged between the second power supply unit 411 and the scanner unit 102. In addition, a switch 422b is arranged between the third power supply unit 412 and the scanner IP 103. These switches 422a and 422b change between ON and OFF states, depending on the control signal K output from the power control unit 23. The scanner driving unit 103 reciprocates a scanner unit (not illustrated)) in a main-scanning direction.

Figure 3:
FIG. 3 (including FIGS. 3A and 3B) is a flowchart illustrating a control method of the image forming apparatus.
Figure 3A:
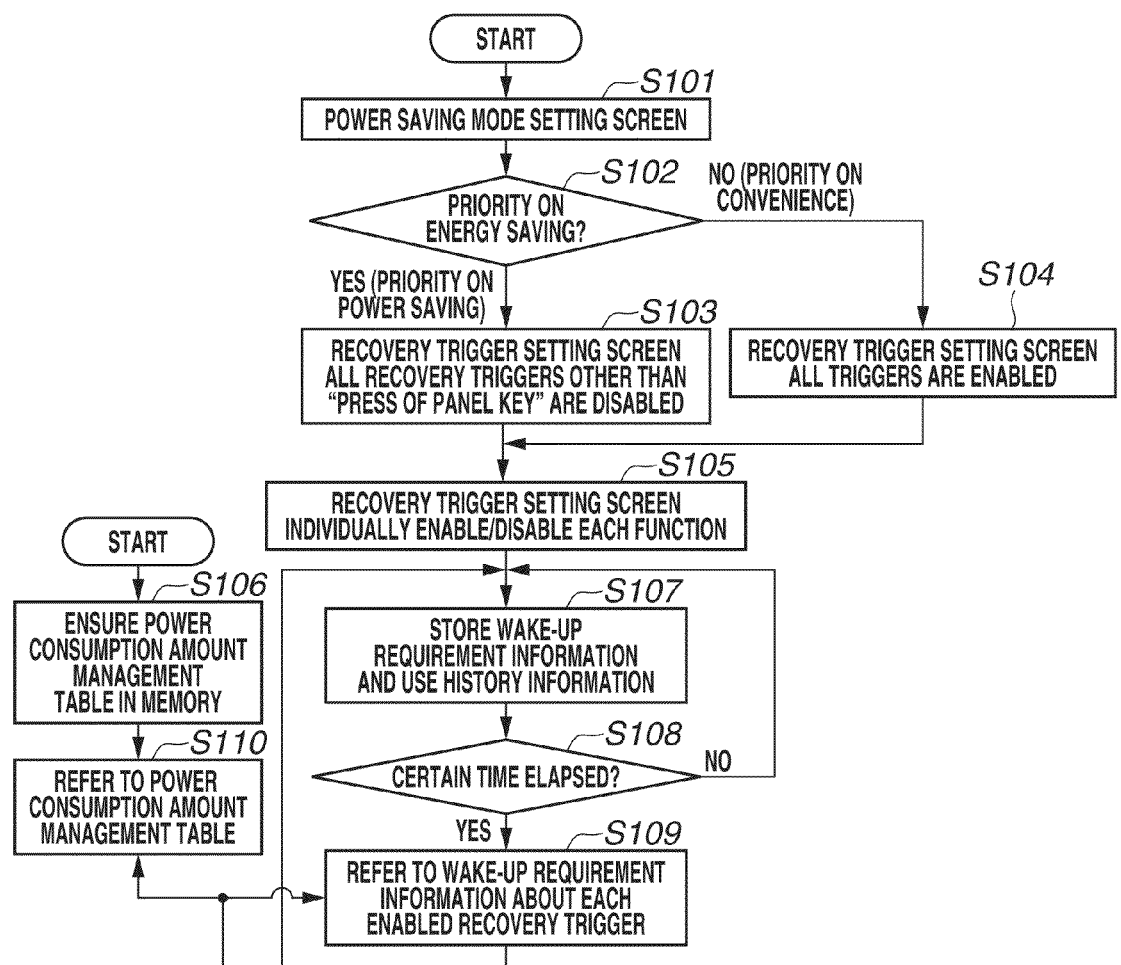
Figure 3B:
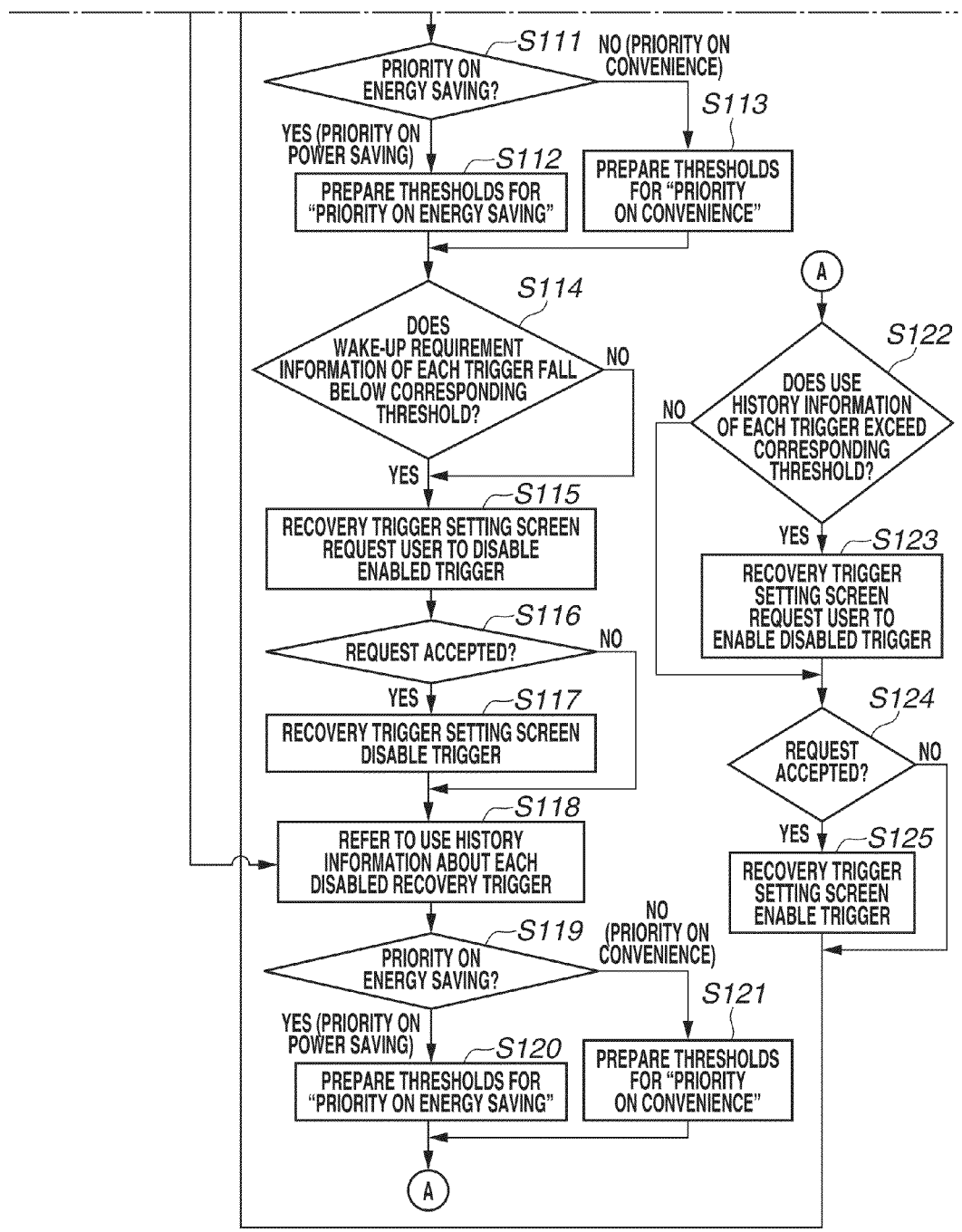

FIG. 3 is a flowchart illustrating a control method of the image forming apparatus 10 according to the present exemplary embodiment. FIG. 3 illustrates power saving control based on a power saving mode setting. Each step is realized by causing the memory unit 104 to load program data stored in the ROM in the core unit 101 and causing the core unit 101 to execute the data.

First, in step S101, the image forming apparatus 10 is set to the power saving mode. More specifically, the display control unit 109 displays a power saving mode setting screen on the operation unit 12 so that the user can select either "priority on energy saving" or "priority on convenience." Next, in step S102, the core unit 101 determines whether the user has checked "priority on energy saving" as a transition condition on the power saving mode setting screen illustrated in FIG. 4A(1).

If the user selects "priority on energy saving (priority on power saving)," the core unit 101 disables functions to be affected by power constraint in the power saving mode. Namely, unnecessary standby power consumption is minimized. In contrast, if the user selects "priority on convenience," the core unit 101 enables functions affected by power constraint even in the power saving mode. Namely, these functions can be activated in the shortest standby time.

If the user selects "priority on energy saving" as illustrated in FIG. 4A(1) (YES in step S102), the operation proceeds to step S103. In step S103, the display control unit 109 displays a recovery trigger setting screen as illustrated FIG. 4A(2). In the present exemplary embodiment, all the recovery triggers other than "press of panel key" are disabled.

Thus, if the user wishes to use these functions disabled in the power saving mode, the user needs to press a panel key to bring back the image forming apparatus 10 to its normal operation state. However, the image forming apparatus 10 has a function of recovering from the power saving mode anytime without requiring the user to enable/disable any recovery triggers. For example, the image forming apparatus 10 can recover from the power saving mode by receiving a job or performing an alarm service, other than recognizing press of a panel key.

In contrast, in step S102, if the user selects "priority on convenience" as illustrated in FIG. 5A(1) (NO in step S102), the operation proceeds to step S104. In step S104, the display control unit 109 displays a recovery trigger setting screen as illustrated FIG. 5A(2). In the present exemplary embodiment, the core unit 101 causes the display control unit 109 to display the recovery trigger setting screen on which all the recovery triggers are enabled as illustrated in FIG. 5A(2). Next, the operation proceeds to step S105. If the user selects "priority on convenience," the user can use functions corresponding to these recovery triggers in the shortest standby time even in the power saving mode.

Figure 4B:
FIGS. 4B(1) and 4B(2) illustrate UI screens displayed by the image forming apparatus.

In addition to the display control in steps S103 and S104, the flowchart may include step S105 in which the core unit 101 allows the user to individually enable/disable each function in the power saving mode. The advantageous effects of the present exemplary embodiment are not affected by the addition of step S105. In the present exemplary embodiment, a screen displayed after the user individually sets each function on the default screen is deemed as a screen before updated (FIG. 4B(1) and FIG. 5B(1)). In FIG. 4B(1), the function corresponding to "reading of card" is enabled from the default screen. This "reading of card" signifies a user operation of holding up a card, which can perform near field wireless communication, in the vicinity of a communication antenna of the image forming apparatus 10.

In contrast, in FIG. 5B(1), the functions corresponding to "paper on manual feed tray" and "operation of touch panel" are disabled from the default screen.

Next, in step S106, the core unit 101 ensures in the non-volatile memory a table for managing the power consumption amounts of the functions used by the image forming apparatus 10 in the power saving mode.

FIG. 6 illustrates a specific configuration of a power consumption amount management table, assuming that the functions corresponding to the recovery triggers in FIG. 4B, FIG. 5B, etc. are used.

The image forming apparatus 10 can be divided into the scanner unit 102, the print engine 116, the display control unit 109, and the control unit 117. The power consumption amount management table illustrated in FIG. 6 is for managing operation modes of these units when the functions are used.

In FIG. 6, "OFF" is an operation mode of a unit and represents that the power supply to this unit is set to an OFF state. In contrast, "ON" is an operation mode of a unit and represents that the power supply to this unit is set to an ON state. In addition, "power saving 1" and "power saving 2" are states representing respective power consumption amounts. When a unit is in one of the states, while the power supply to this unit is set to the ON state, at least one circuit block in the unit is not provided with the power supply. The power consumption amount corresponding to power saving 1 is larger than that corresponding to power saving 2.

For example, FIG. 6 indicates that, when the user places paper on a manual feed tray in the power saving mode, the image forming apparatus 10 needs a total of aa (W) to recognize completion of supply of the paper. Likewise, when in the power saving mode, the image forming apparatus 10 needs a total of ee (W) to accept press of a panel key. FIG. 6 also illustrates each eco-status that is obtained by comparing a threshold with the total corresponding thereto. Each eco-status is an indirect expression of a power consumption amount.

FIG. 7 illustrates power saving levels of the image forming apparatus 10 according to the present exemplary embodiment. FIG. 7 illustrates power saving states of the image forming apparatus 10 on the basis of the power consumption amount management table illustrated in FIG. 6.

Next, in step S107, the core unit 101 stores wake-up requirement information and use history information in the non-volatile memory on the basis of the power saving mode setting selected by the user and the recovery trigger setting individually set by the user.

The wake-up requirement information represents how many times each of the functions corresponding to the enabled recovery triggers has been detected when the image forming apparatus 10 has recovered from the power saving mode to the normal operation state. The wake-up requirement information is stored as a number. In contrast, the use history information represents how many times each of the functions corresponding to the disabled recovery triggers has been detected in the normal operation state as a recovery trigger from an idle state to an active state. The use history information is also stored as a number.

The wake-up requirement information and the use history information can be managed by the core unit 101. Alternatively, the wake-up requirement information and the use history information may be regularly forwarded to an external apparatus via the NIC unit 113, and a storage apparatus of the external apparatus may be configured to manage the forwarded information. The advantageous effects of the present exemplary embodiment are not affected even if the core unit 101 is configured to receive information from the external apparatus as needed.

[Processing Performed when Priority on Convenience is Selected]

Next, in step S108, the core unit 101 determines whether the core unit 101 has stored the information in the internal non-volatile memory for a certain time (time interval) set in the image forming apparatus 10. If so (YES in step S108), the operation proceeds to step S109. If not (NO in step S108), the operation returns to step S107. In step S109, the core unit 101 refers to the wake-up requirement information about the enabled recovery triggers in the stored information and performs the following power saving control.

In step S111, the core unit 101 determines whether "priority on energy saving" is selected. In step S111, if the core unit 101 determines that "priority on convenience" is selected (NO in step S111), the operation proceeds to step S113. In step S113, since all the recovery triggers are enabled as described above, the standby power consumption is large (FIG. 5B(1)).

More specifically, in step S109, the core unit 101 refers to the wake-up requirement information in the stored information stored in step S107 and determines how many times each of the enabled recovery triggers has been detected (steps S109 to S117). The core unit 101 refers to the use history information in the stored information and determines how many times each of the disabled recovery triggers has been used (steps S118 to S125).

However, since no recovery triggers are disabled by default, the core unit 101 needs to refer to the use history information only when the user individually sets the recovery trigger(s) or when the user resets the power saving mode.

After the core unit 101 refers to the wake-up requirement information in step S109, the operation proceeds to step S111. In step S111, the core unit 101 determines whether priority needs to be placed on energy saving in the power saving mode. More specifically, in step S111, the core unit 101 determines how many times each of the functions which can achieve large power saving effects has been detected as recovery triggers on the basis of the power consumption amount management table. In step S111, if the core unit 101 determines that priority needs to be placed on energy saving (YES in step S111), the operation proceeds to step S112. In step S112, the core unit 101 prepares, as determination thresholds, thresholds for "priority on energy saving." If the core unit 101 determines that priority needs to be placed on convenience (NO in step S111), the operation proceeds to step S113. In step S113, the core unit 101 prepares, as determination thresholds, thresholds for "priority on convenience." Next, the operation proceeds to step S114.

For example, among the enabled recovery triggers set in FIG. 5B(1), disabling the recovery trigger "detection of ADF document" can achieve the largest power saving effect. Thus, the core unit 101 first determines how many times this trigger "detection of ADF document" has been detected by referring to the history of recovery from the power saving mode. More specifically, in step S114, the core unit 101 determines whether the number of times when "detection of ADF document" has been detected in a certain time falls below the corresponding threshold. The detection statuses of the other recovery triggers corresponding to the other functions achieving small power saving effects are similarly determined.

For example, in the case of the setting illustrated in FIG. 5B, the core unit 101 determines the recovery history on "reading of a card" and "detection by human body detection sensor" in this order. It is desirable that a recovery history determination threshold used for a function achieving a large power saving effect be smaller than that used for a function achieving a small power saving effect. This is because if two functions indicate the same recovery history, disabling the one achieving the larger power saving effect can achieve a larger power reduction effect for the user.

The core unit 101 determines whether the recovery history determination result of each of the enabled recovery triggers falls below a corresponding threshold and causes the display control unit 109 to display a message screen for requesting the user to disable the relevant enabled triggers on the operation unit 12 (FIG. 5B(2)).

In step S115, since the recovery history determination results of the functions corresponding to "detection of ADF document" and "detection by human body detection sensor" fall below the respective set determination thresholds, the core unit 101 notifies the user of a request of disabling these functions, to improve the power reduction effect, as illustrated in FIG. 5B(2).

Next, in step S116, as illustrated in FIG. 5C(1), the core unit 101 determines whether the user has accepted the request of disabling the above functions displayed by the display control unit 109 (whether the user has checked the check boxes). If the core unit 101 determines that the user has accepted the request (YES in step S116), the operation proceeds to step S117. In step S117, the core unit 101 displays the setting updated by disabling the above functions on the operation unit 12, as illustrated in FIG. 5D(2).

Next, in step S118, the core unit 101 refers to the use history information about the disabled recovery triggers. In step S119, the core unit 101 determines whether "priority on energy saving" is selected. More specifically, the core unit 101 refers to the power amount management table and makes the determination on the basis of the use history statuses of functions achieving small power saving effects. In step S119, if the core unit 101 determines that "priority on energy saving" is selected (YES in step S119), the operation proceeds to step S120. In step S120, the core unit 101 prepares thresholds for "priority on energy saving." If the core unit 101 determines that "priority on convenience" is selected (NO in step S119), the operation proceeds to step S121. In step S121, the core unit 101 prepares thresholds for "priority on convenience."

For example, in the case of the setting example in FIG. 5A(2), the core unit 101 determines whether an operation of a touch panel is a recovery trigger from an idle state to an active state in the normal operation state. Of course, an operation of a touch panel is a recovery trigger from the idle state." Thus, regarding an operation of a touch panel, a series of operations performed by the same user is counted as a single operation.

Next, in step S122, in contrast to the above case in which the core unit 101 refers to the wake-up requirement information, the core unit 101 determines whether the number of times when each of the disabled recovery triggers has been detected in a certain time exceeds a corresponding threshold.

Likewise, the core unit 101 checks the use history statuses of functions achieving large power saving effects. For example, in the case of the setting example in FIG. 5A(2), the core unit 101 checks the use history of the recovery trigger "paper on manual feed tray." It is desirable that a use history determination threshold used for a function achieving a large power saving effect be larger than that used for a function achieving a small power saving effect. This is because if two functions indicate the same use history, enabling the one achieving the smaller power saving effect can achieve a smaller power increase effect for the user.

In step S122, the core unit 101 determines whether the use history determination result of each of the disabled recovery triggers exceeds a corresponding threshold. In step S123, the core unit 101 causes the display control unit 109 to display a message screen for requesting the user to enable the relevant disabled triggers on the operation unit 12 (FIG. 5C(2)). Since the use history determination results of the functions corresponding to the recovery triggers "paper on manual feed tray" and "operation of touch panel", exceed the respective thresholds, the core unit 101 notifies the user of a request of enabling these functions to improve the convenience, as illustrated in FIG. 5C(2).

Next, in step S124, the core unit 101 causes the display control unit 109 to display a check screen so that the user can accept or reject the request of enabling the setting (FIG. 5D(1)). In step S124, if the core unit 101 determines that the user has rejected the request of enabling the setting (NO in step S124), the operation returns to step S107.

In step S124, if the core unit 101 determines that the user has accepted the request of enabling the setting (YES in step S124), the operation proceeds to step S125. In step S125, the core unit 101 reflects the user operation and updates the recovery trigger setting screen as illustrated in FIG. 5D(2). Next, the operation returns to step S107.

Thus, if the user accepts the request made in view of the recovery history determination results and rejects the request made in view of the use history determination results, after the setting is updated, a better eco-status than before is obtained (more eco-marks are displayed), as illustrated in FIG. 5D(2).

[Processing Performed when Priority on Energy Saving is Selected]

If the user selects "priority on energy saving" in FIG. 4A(1), all the recovery triggers other than "press of panel key" are disabled as illustrated in FIG. 4A(2). Thus, the standby power consumption is small (FIG. 4B(1)). The recovery trigger other than "press of panel key" is released, for example, when a document set on the ADF is detected, when a touch operation on the display unit is performed, when a user near the image forming apparatus 10 is detected, and when a key operation is performed. In addition, the recovery is triggered when a card is read by a card reader.

As in a case where "priority on convenience" is selected, if the user selects "priority on energy saving", the core unit 101 refers to the wake-up requirement information and the use history information in accordance with the flowchart illustrated in FIG. 3 (steps S109 to S125). However, since no recovery triggers other than "press of a panel key" are enabled by default, the core unit 101 needs to refer to the wake-up requirement information only when the user individually sets the recovery trigger(s) or when the user resets the power saving mode.

As described above, first, the core unit 101 refers to the wake-up requirement information and the power amount management table illustrated in FIG. 6 to examine functions achieving large power saving effects (steps S109 to S117). In the case of the setting example illustrated in FIG. 4B(2), since only the recovery trigger "reading of card" is enabled, the core unit 101 determines how many times the trigger "reading of card" has been detected in the history of recovery from the power saving mode.

In step S114, if the core unit 101 determines the trigger "reading of card" falls below the corresponding threshold (YES in step S114), the core unit 101 causes the display control unit 109 to display a message screen for requesting the user to disable this trigger on the operation unit 12 (FIG. 4B(2)).

FIG. 4C(1) illustrates a screen on which the user has rejected the request of disabling the trigger after viewing the content that the core unit 101 has caused the display control unit 109 to present display. This screen displays a check box YES for accepting the request and a check box NO for rejecting the request. By allowing the user to check either one of the check boxes, the core unit 101 can determine whether the request has been accepted.

Next, the core unit 101 refers to the use history information and the power amount management table to examine functions achieving small power saving effects (steps S118 to S125). In the setting example in FIG. 4D, the core unit 101 determines how many times each of "detection by human body detection sensor," "operation of touch panel," "detection of ADF document," and "paper on manual feed tray" has been used as a recovery trigger from the idle state to the active state in the normal operation in this order. In step S122, the core unit 101 determines that the use history determination results of the triggers "detection of ADF document" and "detection by human body detection sensor" exceed the respective thresholds. Consequently, in step S123, the core unit 101 causes the display control unit 109 to display a message screen for requesting the user to enable these triggers on the operation unit 12 (FIG. 4C(2)). Since the core unit 101 determines that the use history determination results of the triggers "operation of touch panel" and "paper on manual feed tray" fall below the respective thresholds, these triggers are not displayed on the message screen.

Figure 4D:
FIGS. 4D(1) and 4D(2) illustrate UI screens displayed by the image forming apparatus.

If the core unit 101 determines that a use history determination result exceeds a corresponding threshold (YES in step S122), the operation proceeds to step S123. In step S123, the core unit 101 causes the display control unit 109 to display a setting screen for allowing the user to accept/reject the request for enabling the setting after viewing the content displayed by the display control unit 109 on the operation unit 12. FIG. 4D(1) illustrates the setting screen on which the user has accepted the request (steps S124 and S125).

After a user operation in response to each setting update request is reflected in this way, the core unit 101 causes the display control unit 109 to update the recovery trigger setting screen as illustrated in FIG. 4D(2). In the present exemplary embodiment, the user has rejected the recovery history determination results and accepted the use history determination results. As a result, while the eco-status has been decreased, the convenience has been increased after the update.

In addition, in the present exemplary embodiment, since "priority on energy saving" and "priority on convenience" can be selected in the initial power saving mode setting, it is possible to change how a threshold for the wake-up requirement information or use history information per recovery trigger is determined.

More specifically, a threshold for use history information determination made when "priority on energy saving" is selected, can be increased to be larger than a threshold when "priority on convenience" is selected. In this way, unless the use history when "priority on energy saving" is selected exceeds the use history when "priority on convenience" is selected, the core unit 101 does not cause the display control unit 109 to display the setting update screen for requesting the user to enable the relevant function(s) (steps S119 to S121).

In contrast, the core unit 101 can set a threshold for wake-up requirement information determination when "priority on convenience" is selected to be higher than a threshold when "priority on energy saving" is selected. In this way, unless the recovery history used when "priority on convenience" is selected exceeds that used when "priority on energy saving" is selected, the core unit 101 does not cause the display control unit 109 to display the setting update screen for requesting the user to disable the relevant function(s) (steps S111 to S113).

In addition, steps S101 to S104 relating to the initial power saving mode setting may be removed so that the user can only be allowed to individually enable/disable each function at the time of the power saving mode, in a default state. In such case, on the basis of the setting result, the user can be notified of the setting update automatically. In this way, the same advantageous effects can also be obtained.

In addition, in the present exemplary embodiment, whether a currently enabled function needs to be disabled is constantly monitored by examining the wake-up requirement information. In contrast, whether a currently disabled function needs to be enabled may be constantly monitored by examining the use history information.

According to the present exemplary embodiment, an optimum recovery trigger setting is automatically configured and the user is requested to change the setting. Thus, if the user places priority on energy saving, the image forming apparatus 10 does not consume unnecessary power. If the user places priority on convenience, the image forming apparatus 10 can operate with the shortest standby time.

Each process in the present invention can be realized by causing a processing unit (CPU, processor, etc.) of a personal computer or the like to execute software (program) acquired via a network or a storage medium of an arbitrary kind.

The present invention is not limited to the above exemplary embodiments. Various variations (including organic combinations of various exemplary embodiments) are possible on the basis of the gist of the present invention, and such variations are included in the scope of the present invention.

According to the present exemplary embodiment, it is possible to realize power saving control that matches a power saving environment set by a user and that achieves convenience and power saving.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-247707 filed Nov. 29, 2013, which is hereby incorporated by reference herein in its entirety.

What is claimed is:

1. An image forming apparatus that switches to a second power state which is lower than a first power state, the image forming apparatus comprising:
   a plurality of execution units configured to execute predetermined functional processing;
   a selection unit configured to select priority on power saving or priority on convenience as a condition for switching to the second power state which is lower than the first power state;
   a reception unit configured to receive a plurality of recovery triggers for switching to the first power state from the second power state;
   a storage unit configured to store a number of times of detection of each recovery trigger received by the reception unit;
   a determination unit configured to determine, if the selection unit selects priority on convenience, whether the number of times of detection of each recovery trigger requiring a large power amount consumed by execution units associated with each recovery trigger, which is stored in the storage unit, falls below a predetermined threshold;
   a notification unit configured to notify a user of a recovery trigger as the recovery trigger that needs to be disabled, if the determination unit determines that the number of times of detection of the recovery trigger falls below a corresponding predetermined threshold; and
   a disabling unit configured to, if the user accepts disabling a recovery trigger of which the user has been notified by the notification unit, disable the recovery trigger determined to fall below a corresponding predetermined threshold.

2. The image forming apparatus according to claim 1, wherein the execution units that execute the predetermined functional processing include a scanner unit that reads images, a printer unit that performs printing, a display control unit that displays information, and a control unit that controls each of the functional processing.

3. The image forming apparatus according to claim 2, wherein one of the recovery triggers is released when a sheet is manually set on the printer unit.

4. The image forming apparatus according to claim 2, wherein one of the recovery triggers is released when a document is set on a document feed unit of the scanner unit.

5. The image forming apparatus according to claim 1, wherein one of the recovery triggers is released when a touch operation is performed on a display unit.

6. The image forming apparatus according to claim 1, wherein one of the recovery triggers is released when a card is read by a card reader.

7. The image forming apparatus according to claim 1, wherein one of the recovery triggers is released when a user nearing the image forming apparatus is detected.

8. The image forming apparatus according to claim 1, wherein one of the recovery triggers is released when a key operation is detected.

9. The image forming apparatus according to claim 1, wherein if the selection unit selects priority on convenience, the determination unit determines whether the number of times of detection of each recovery trigger requiring a large power amount consumed by each execution unit associated with each recovery triggers, which is stored in the storage unit, falls below a predetermined threshold at preset time intervals.

10. An image forming apparatus that switches to a second power state which is lower than a first power state, the image forming apparatus comprising:
    a plurality of execution units configured to execute predetermined functional processing;
    a selection unit configured to select priority on power saving or priority on convenience as a condition for switching to the second power state which is lower than the first power state;
    a reception unit configured to receive a plurality of recovery triggers for switching to the first power state from the second power state;
    a storage unit configured to store a number of times of detection of each recovery trigger received by the reception unit;
    a determination unit configured to determine, if the selection unit selects priority on power saving, whether the number of times of detection of each recovery trigger requiring a large power amount consumed by execution units associated with each recovery trigger, which is stored in the storage unit, exceeds a predetermined threshold;
    a notification unit configured to notify a user of a recovery trigger as the recovery trigger that needs to be enabled if the determination unit determines that the number of times of detection of the recovery trigger exceeds the predetermined threshold; and
    an enabling unit configured to enable, if the user accepts enabling a recovery trigger of which the user has been notified by the notification unit, the recovery trigger determined to be exceeding the predetermined threshold.

11. The image forming apparatus according to claim 10, wherein the execution units that execute the predetermined functional processing include a scanner unit that reads images, a printer unit that performs printing, a display control unit that displays information, and a control unit that controls each of the functional processing.

12. The image forming apparatus according to claim 11, wherein one of the recovery triggers is released when a sheet is manually set on the printer unit.

13. The image forming apparatus according to claim 11, wherein one of the recovery triggers is released when a document is set on a document feed unit of the scanner unit.

14. The image forming apparatus according to claim 10, wherein one of the recovery triggers is released when a touch operation is performed on a display unit.

15. The image forming apparatus according to claim 10, wherein one of the recovery triggers is released when a card is read by a card reader.

16. The image forming apparatus according to claim 10, wherein one of the recovery triggers is released when a user nearing the image forming apparatus is detected.

17. The image forming apparatus according to claim 10, wherein one of the recovery triggers is released when a key operation is detected.

18. The image forming apparatus according to claim 10, wherein, if the selection unit selects priority on power saving, the determination unit determines whether the number of times of detection of each recovery trigger requiring a large power amount consumed by execution units associated with each recovery trigger, which is stored in the storage unit, exceeds a predetermined threshold at preset time intervals.

19. A control method of an image forming apparatus which comprises a plurality of execution units configured to execute predetermined functional processing, and which switches to a second power state lower than a first power state, the control method comprising:
    selecting priority on power saving or priority on convenience as a condition for switching to the second power state which is lower than the first power state;
    receiving a plurality of recovery triggers for switching to the first power state from the second power state;
    storing a number of times of detection of each recovery trigger received by the receiving in a storage unit of the image forming apparatus;
    determining, if the selecting selects priority on convenience, whether the number of times of detection of each recovery trigger requiring a large power amount consumed by execution units associated with each recovery trigger, which is stored in the storage unit of the image forming apparatus, falls below a predetermined threshold;
    notifying a user of the image forming apparatus of a recovery trigger as the recovery trigger that needs to be disabled if the determining determines that the number of times of detection of the recovery trigger falls below the predetermined threshold; and
    disabling, if the user accepts disabling a recovery trigger of which the user has been notified by the notifying, the recovery trigger determined to fall below a corresponding predetermined threshold.

20. A control method of an image forming apparatus which comprises a plurality of execution units configured to execute predetermined functional processing, and which switches to a second power state which is lower than a first power state, the control method comprising:
    selecting priority on power saving or priority on convenience as a condition for switching to the second power state which is lower than the first power state;
    receiving a plurality of recovery triggers for switching to the first power state from the second power state;
    storing a number of times of detection of each recovery trigger received by the receiving in a storage unit of the image forming apparatus;
    determining, if the selecting selects priority on power saving, whether the number of times of detection of each recovery trigger requiring a large power amount consumed by execution units associated with each recovery triggers, which is stored in the storage unit of the image forming apparatus, exceeds a predetermined threshold;
    notifying a user of the image forming apparatus of a recovery trigger as the recovery trigger that needs to be enabled, if the determining determines that the number of times of detection of the recovery trigger exceeds the predetermined threshold; and
    enabling, if the user accepts enabling a recovery trigger of which the user has been notified by the notifying, the recovery trigger determined to exceed the predetermined threshold.

* * * * *